US008229159B2

(12) United States Patent  
Tourapis et al.

(10) Patent No.: US 8,229,159 B2  
(45) Date of Patent: Jul. 24, 2012

(54) MULTIMEDIA CODING AND DECODING WITH ADDITIONAL INFORMATION CAPABILITY

(75) Inventors: Alexandros Tourapis, Burbank, CA (US); Athanasios Leontaris, Burbank, CA (US); Kevin J. Stec, Los Angeles, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 1020 days.

(21) Appl. No.: 12/188,919

(22) Filed: Aug. 8, 2008

(65) Prior Publication Data

US 2009/0087110 A1    Apr. 2, 2009

Related U.S. Application Data

(60) Provisional application No. 60/976,185, filed on Sep. 28, 2007.

(51) Int. Cl.  
*G06K 9/00* (2006.01)

(52) U.S. Cl. ...................................... 382/100

(58) Field of Classification Search ............... 382/100, 382/232, 236, 238  
See application file for complete search history.

(56) References Cited

U.S. PATENT DOCUMENTS

| 4,433,207 | A |   | 2/1984  | Best             |         |
|-----------|---|---|---------|------------------|---------|
| 4,969,041 | A |   | 11/1990 | O Grady et al.   |         |
| 5,161,210 | A |   | 11/1992 | Druyvesteyn et al.|        |
| 5,319,735 | A |   | 6/1994  | Preuss et al.    |         |
| 5,327,237 | A |   | 7/1994  | Gerdes et al.    |         |
| 5,530,751 | A |   | 6/1996  | Morris           |         |
| 5,689,587 | A |   | 11/1997 | Bender et al.    |         |
| 5,768,431 | A | * | 6/1998  | Saunders et al.  | 382/236 |
| 5,825,931 | A | * | 10/1998 | Owada et al.     | 382/236 |
| 6,031,914 | A |   | 2/2000  | Tewfik et al.    |         |
| 6,064,748 | A |   | 5/2000  | Hogan            |         |
| 6,192,138 | B1|   | 2/2001  | Yamadaji         |         |
| 6,233,347 | B1| * | 5/2001  | Chen et al.      | 382/100 |
| 6,314,518 | B1|   | 11/2001 | Linnartz         |         |
| 6,424,725 | B1|   | 7/2002  | Rhoads et al.    |         |
| 6,523,114 | B1|   | 2/2003  | Barton           |         |
| 6,647,129 | B2|   | 11/2003 | Rhoads           |         |
| 6,674,876 | B1| * | 1/2004  | Hannigan et al.  | 382/100 |

(Continued)

FOREIGN PATENT DOCUMENTS

EP    1796398 A1    6/2007

(Continued)

OTHER PUBLICATIONS

J.P.M.G. Linnartz et al., "MPEG PTY-Marks: Cheap Detection of Embedded Copyright Data in DVD-Video", Proceedings of the European Symposium on Research in Computer Security (ESORICS), Springer Verlag, Berlin, DE, Sep. 16, 1998, (1998-09-16), pp. 221-240, XP000953806.

(Continued)

*Primary Examiner* — Tom Y Lu  
(74) *Attorney, Agent, or Firm* — Fish & Richardson P.C.

(57) ABSTRACT

A multimedia coding and decoding system and method is presented that uses the specific prediction mode to signal supplemental information, e.g., metadata, while considering and providing trade offs between coding performance and metadata capacity. The prediction mode can be encoded according to a mode table that relates mode to bits and by considering coding impact. Start and stop codes can be used to signal the message, while various techniques of how to properly design the mode to bits tables are presented.

24 Claims, 9 Drawing Sheets

U.S. PATENT DOCUMENTS

| | | | |
|---|---|---|---|
| 6,701,062 | B1 | 3/2004 | Talstra et al. |
| 6,785,332 | B1 | 8/2004 | Kutter et al. |
| 6,798,893 | B1 * | 9/2004 | Tanaka .................. 382/100 |
| 6,850,567 | B1 | 2/2005 | Frimout et al. |
| 6,975,770 | B2 * | 12/2005 | Kondo et al. ............. 382/238 |
| 7,006,631 | B1 * | 2/2006 | Luttrell et al. ............. 380/217 |
| 7,039,113 | B2 | 5/2006 | Soundararajan |
| 2002/0010859 | A1 | 1/2002 | Macda |
| 2002/0131511 | A1 | 9/2002 | Zenoni |
| 2004/0024588 | A1 | 2/2004 | Watson et al. |
| 2004/0264733 | A1 | 12/2004 | Rhoads et al. |
| 2005/0094728 | A1 | 5/2005 | Frimout et al. |
| 2007/0053438 | A1 | 3/2007 | Boyce et al. |
| 2007/0174059 | A1 | 7/2007 | Rhoads et al. |
| 2007/0268406 | A1 | 11/2007 | Bennett |
| 2008/0007649 | A1 | 1/2008 | Bennett |
| 2008/0007650 | A1 | 1/2008 | Bennett |
| 2008/0007651 | A1 | 1/2008 | Bennett |
| 2008/0018784 | A1 | 1/2008 | Bennett |
| 2008/0018785 | A1 | 1/2008 | Bennett |

FOREIGN PATENT DOCUMENTS

| | | |
|---|---|---|
| EP | 1871098 A2 | 12/2007 |
| WO | WO9911064 A3 | 6/1999 |

OTHER PUBLICATIONS

Hitoshi Kiya et al, "A method of inserting binary data into MPEG bitsreams for video index labeling", Image Processing, 1999, ICIP 99, Proceedings, 1999 International Conference in Kobe, Japan, Oct. 24-28, 1999, Piscataway, NJ, USA, IEEE, pp. 285-289, XP010368651.

Gang Qui et al., "A hybrid watermarking scheme for H.264/AVC video", Pattern Recognition, 2004, ICPR 2004, Proceedings of the 17th International Conference in Cambridge, UK, Aug. 23-26, 2004, Piscataway, NJ, USA, IEEE, vol. 4, Aug. 23, 2004 (2004-04-23), pp. 865-868, XP010724057, ISBN: 978-0-7695-2128-2.

International Preliminary Report on Patentability issued in PCT/US2008/072616 on Aug. 12, 2010, 13 pages.

European Patent Office Action for Application No. 08 836 168.8-2223 dated Aug. 12, 2011, 5 pages.

Zhenyong Chen, Zhang Xiong, and Long Tang, "A Novel Scrambling Scheme for Digital Video Encryption", Advances in Image and Video Technology, Springer Berlin/Heidelberg, vol. 4319/2006, Dec. 9, 2006, pp. 997-1006.

ITU-T, "Video codec for audiovisual services at px64 kbits/s," ITU-T Rec. H.261, Nov. 1990, 32 pages.

ITU-T, "Video codec for audiovisual services at px64 kbits/s," ITU-T Rec. H.261, Mar. 1993, 29 pages.

ITU-T and ISO.IEC JTC 1, "Generic coding of moving pictures and associated audio information—Part 2: Video," ITU-T Rec. H.262 and ISO/IEC 13818-2 (MPEG-2), Jul. 1995, 211 pages.

ITU-T, "Video coding for low bit rate communication," ITU-T Rec. H. 263, Mar. 1996, 52 pages.

ITU-T, "Video coding for low bit rate communication," ITU-T Rec. H. 263, Feb. 1998, 167 pages.

ISO/IEC JTC 1, "Coding of audio-visual objects—Part 2: Visual," ISO/IEC 14496-2 (MPEG-4 Part 2), Dec. 1999, 348 pages.

A. Tourapis and Athanasios, "H.264/MPEG-4 AVC Reference Software Manual", JVT reference software version JM12.2, http://iphome.hhi.de/suehring/tml/download/ , Jul. 2007, 75 pages.

*Advanced video coding for generic audiovisual services*, http://www.itu.int.rec/reccomendation.asp?type=folders&lang=e&parent.T-REC-H.264, May 2003, 28 pages.

SMPTE 421M, "VC-1 Compressed Video Bitstream Format and Decoding Process", Feb. 2006, 493 pages.

M. A .Robertson et al., "Data Hiding in MPEG Encoding by Constrained Motion Vector Search", Proceedings of the 5th IASTED International Conference, New York, Aug. 2003, 6 pages.

F. Jordan, M. Kutter, and T. Ebrahimi, "Proposal of a watermarking technique for hiding/retrieving data in compressed and decompressed video", ISO/IEC JTC1/SC21/WG11 MPEG-4 meeting, contribution M2281, Jul. 1997, 4 pages.

J. Song et al., "A Data Embedded Video Coding Scheme for Error-Prone Channels", in IEEE Transaction on Multimedia, Dec. 2001, 9 pages.

T. H. Cormen et al., "Introduction to Algorithms Second Edition", MIT Press and McGraw-Hill, ISBN 0-262-03293-7, 2001, 9 pages.

Martin Kroger, "Shortest Multiple Disconnected Path for the Analysis of Entanglements in Two- and Three-Dimensional Polymeric Systems", Computer Physics Communications vol. 168, p. 209, Jan. 2005 , 24 pages.

E. W. Dijkstra, "A Note on Two Problems in Connexion with Graphs", Numerische Mathematik 1, p. 269-271, 1959, 3 pages.

E. L. Lawler, et al., "The Traveling Salesman Problem: A Guided Tour of Combinational Optimization", John Wiley & Sons. ISBN 0-471-90413-9, 1985, 4 pages.

G. Gutin et al., "The Traveling Salesman Problem and its Variations", Springer, ISBN 0-387-44459-9, 2006, 7 pages.

International Search Report and Written Opinion issued on Apr. 4, 2009 in corresponding PCT Application, PCT/US2008/072616 (21 pages).

Fred Jordan et al., "Proposal of a watermarking technique to hide/retrieve copyright data in video", Video Standards and Dracts, XX, XX, No. M2281, Jul. 10, 1997, XP030031553.

Takehiro Moriya et al., "Digital watermarking schemes based on vector quantization", Speech Coding for Telecommunications Proceeding, 1997. 1997 IEEE Works Hop on Pocono Manor, PA, USA Sep. 7-10, 1997, New York, NY, USA, IEEE, US, Sep. 7, 1997, pp. 95-96, XP010236019, ISBN: 978-0-7803-4073-2.

J.P.M.G. Linnartz et al., "MPEG PTY-Marks: Cheap Detection of Embedded Copyright Data in DVD-Video", Proceedings of the European Symposium on Research in Computer Security (ESORICS), Springer Verlag, Berlin, DE, Sep. 16, 1998, pp. 221-240, XP000953806.

Hitoshi Kiya et al, "A method of inserting binary data into MPEG bitsreams for video index labeling", Image Processing, 1999, ICIP 99, Proceedings, 1999 International Conference in Kobe, Japan, Oct. 24-28, 1999, Piscataway, NJ, USA, IEEE (Oct. 24, 1999), pp. 285-289, XP010368651.

Gang Qui et al., "A hybrid watermarking scheme for H.264/AVC video", Pattern Recognition, 2004, ICPR 2004, Proceedings of the 17th International Conference in Cambridge, UK, Aug. 23-26, 2004, Piscataway, NJ, USA, IEEE, vol. 4, Aug. 23, 2004, pp. 865-868, XP010724057, ISBN: 978-0-7695-2128-2.

Text of ISO/IEC 14496-10:200X/FDIS Advanced Video Coding (4th Edition), 81. MPEG Meeting; Feb. 6, 2007-Jun. 6, 2007; Lausanne; (Motion Picture Expert Group or ISO/IEC JTC1/SC29/WG11), No. N9198, Jun. 6, 2007, XP030015692.

* cited by examiner

Intra 16 x 16 Prediction Modes

| a00 | a01 | a02 | a03 |
|---|---|---|---|
| a10 | a11 | a12 | a13 |
| a20 | a21 | a22 | a23 |
| a30 | a31 | a32 | a33 |

| 0 | 1 | 4 | 5 |
|---|---|---|---|
| 2 | 3 | 6 | 7 |
| 8 | 9 | 12 | 13 |
| 10 | 11 | 14 | 15 |

MULTIMEDIA CODING AND DECODING WITH ADDITIONAL INFORMATION CAPABILITY

CROSS REFERENCE TO RELATED APPLICATIONS

This application claims the benefit of priority to U.S. Provisional Application entitled "MULTIMEDIA CODING AND DECODING WITH ADDITIONAL INFORMATION CAPABILITY", Application No. 60/976,185, filed Sep. 28, 2007, the disclosure of which is incorporated by reference.

BACKGROUND

Multimedia signal encoding and decoding, e.g., of video and/or sound, may rely on extreme compression to reduce the amount of information to be sent over a channel. The encoder often carries out comprehensive optimization routines in order to select compression parameters that encode the signal most efficiently.

SUMMARY

The present application describes techniques for transmitting secondary information along with a video signal, in which the secondary information can be encoded by constraints on the specific encoding that is used.

Embodiments here may have the constraints as being prediction types. Embodiments herein also may involve start and end codes. Some embodiments may involve embedding a variety of secondary information within the video bitstream independent of the transport layer. The secondary information can be a series of bits that are encoded by an encoder and subsequently decoded. The coding may be completely transparent to legacy systems. Some embodiments herein can show how coding decisions, such as suboptimal encoding decisions, can be at least partially compensated by subsequent encoding decisions. Some embodiments herein may be used with legacy systems, regardless of whether the legacy systems provide support for secondary information.

BRIEF DESCRIPTION OF THE DRAWINGS

These and other aspects will now be described in detail with reference to the accompanying drawings wherein.

DETAILED DESCRIPTION OF EXAMPLE EMBODIMENTS

Figure 1:
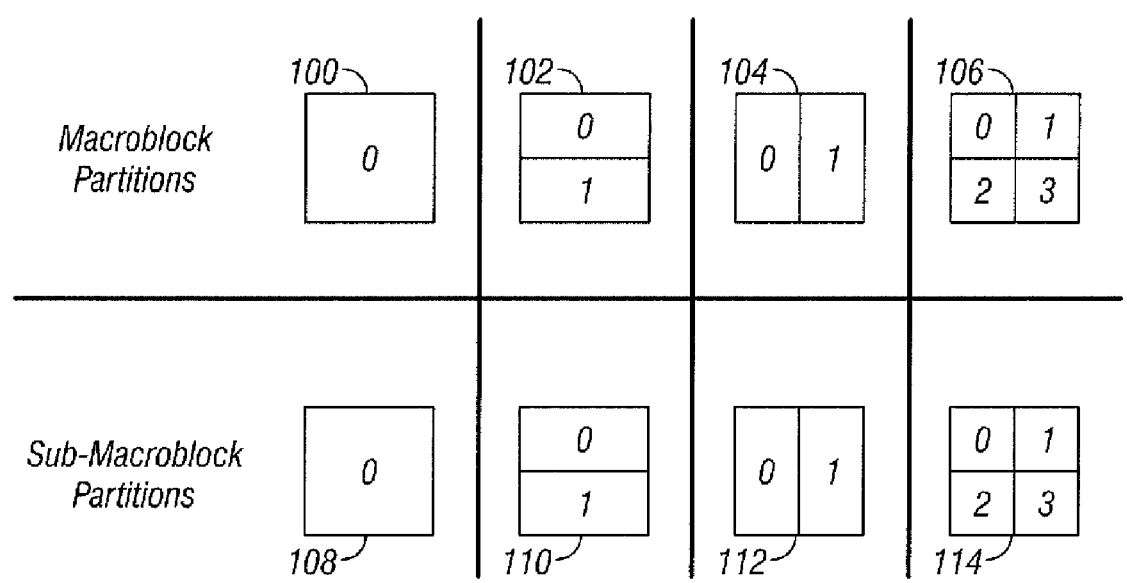
FIG. 1 depicts examples of different macro block and sub-macro block partitions in the AVC video coding standard.

Example embodiments are described herein. In the following description, for the purposes of explanation, numerous specific details are set forth in order to provide a thorough understanding of the present invention. It will be apparent, however, that embodiments of the present invention may be practiced without these specific details. In other instances, well-known structures and devices are shown in block diagram form in order to avoid unnecessarily obscuring the present invention.

Overview

In some aspects, some embodiments feature a method for encoding a discrete-time media signal. The method includes receiving a media signal, obtaining supplemental information to be encoded within the media signal, using the supplemental information to select one encoding type from a number of different encoding types, and encoding the media signal using the one encoding type. The encoding type represents the supplemental information.

These and other embodiments can optionally include one or more of the following features. The media signal can be a video signal. The encoding type can include at least one of a plurality of prediction modes for the video signal. The method can involve grouping together prediction modes into signaling groups which are selected to reduce an effect on coding performance. The method can include defining at least one of a start code and/or an end code and/or length code, and using the encoding type to represent at least one of the start code and/or end code and/or length code within the video signal location adjacent the supplemental information. The start code and/or end code can represent sequences of encoding decisions which are unlikely to occur in real video. The supplemental information can be related to contents of the video signal, and can be temporally synchronized with different portions of the video signal. The supplemental information may be unrelated to the video signal.

The method may involve determining coding types which have approximately similar performance, and grouping the coding schemes to form groups, which can reduce the effect that the step of using will have on coding performance. The method may include detecting a first encoding type that is selected based on the secondary information. The method may include overriding the selection based on the detection. The first encoding type may cause degradation in the video. The step of overriding the encoding type can involve delaying encoding the secondary information until a different area of the video is received. The detection can include basing the step of detecting a change within the video signal. The step of overriding can involve changing between inter-coding and intra-coding being used to represent the supplemental information. The method can involve using external signaling to indicate at least one of a beginning and/or an end of the supplemental information within the video signal. The different encoding types used to encode the supplemental information can include intra-versus inter-prediction, prediction direction, sub partitioning, reference indices, motion and illumination change parameters, transforms, and/or quantization parameters.

In some aspects, some embodiments feature a method that includes decoding an encoded media signal and determining an encoding type that was used for encoding the media signal as one of a plurality of different encoding types. The method includes using the encoding type to access a relationship between media encoding types and bits of information, and obtaining the bits of information as supplemental information from the decoding.

These and other embodiments can optionally include one or more of the following features. The media signal can be a video signal, and the media encoding types can include video encoding modes. The encoding type can include at least one of a plurality of prediction modes for the video signal. The method may include determining at least one of a start code and/or an end code from the bits of information, and detecting the supplemental information adjacent to the start code and/or the end code. The method may involve detecting the supplemental information as temporally synchronized with different portions of the video signal. The method can involve detecting that the supplemental information is unrelated to the video signal. The encoding types can involve inter-coding and intra-coding being used to represent the supplemental information. The method may include detecting external signaling that indicates at least one of a beginning and/or an end of the supplemental information within the video signal. The different encoding types used to encode the supplemental information can include intra-versus inter-prediction, prediction direction, sub partitioning, reference indices, motion and illumination change parameters, transforms, and/or quantization parameters.

In some aspects, some embodiments involve an apparatus that includes a media encoder that operates to encode a media signal in one of plural different prediction modes, an input for supplemental information to be encoded as part of the media signal, and a decision part that involves using the supplemental information to select one of the plural prediction modes based on the supplemental information and to represent the supplemental information.

These and other embodiments can optionally include one or more of the following features. The media signal can include a video signal and/or an audio signal. The media encoder can be a speech encoder. The decision part can include a prediction table that relates prediction modes to bits of supplemental information, in which the table can group together prediction modes into signaling groups that are selected to reduce an effect on coding performance. The decision part may purposely not signal the supplemental information due to its impact on coding performance. The supplemental information may be previously encoded using an error correction scheme. The method may involve storing at least one of a start code and/or an end code, and using the encoder type to represent at least one of the start code and/or end code within the video signal location adjacent to the supplemental information.

These and other embodiments can optionally include one or more of the following features. The start code and/or end code can represent sequences of encoding decisions which are unlikely to occur in real video. The supplemental information may be related to contents of the video signal, and can be temporally synchronized with different portions of the video signal. The supplemental information may be unrelated to the video signal. The decision part can include information indicative of coding schemes that have approximately similar performance, and groups of coding schemes that reduce the effect that the step of using will have on coding performance. The video encoder can detect a first encoding type that is selected based on the secondary information, in which the first encoding type will cause degradation in the video. The video encoder can override the step of using the first encoding type based on the detection. The step of overriding the operation of the video encoder can include delaying encoding the secondary information until a different area of the video. The step of the overriding of the video encoder can include changing between inter-coding and intra-coding being used to represent the supplemental information.

These and other embodiments can optionally include one or more of the following features. The apparatus can include a connection to an external signaling to indicate at least one of a beginning and/or an end of the supplemental information within the video signal. The different encoding types used to encode the supplemental information can include intra-versus inter-prediction, prediction direction, sub partitioning, reference indices, motion and illumination change parameters, transforms, and/or quantization parameters.

In some aspects, some embodiments feature an apparatus that includes a decoder for decoding an encoded media signal and determining an encoding type that was used for decoding. The decoder determines one of a plurality of different encoding types that decoded the media signal. The apparatus includes a logic part for receiving the encoding type and using the encoding type to access a relationship between video encoding types and bits of information, and also to output bits of information as supplemental information from the decoding.

These and other embodiments can optionally include one or more of the following features. The media signal can be a video signal and/or an audio signal. The media decoder can be a speech decoder. The logic part can store a plurality of prediction modes for the media signal and bits relating to the prediction modes. The logic part can also detect at least one of a start code and/or an end code from the bits of information, and may detect the supplemental information adjacent the start code and/or the end code. The logic part can detect and correct errors in the bit information embedded in the media signal. The logic part can detect the supplemental information as temporally synchronized with different portions of the media signal. The logic part may detect that the supplemental information is unrelated to the media signal. The logic part can detect external signaling that indicates at least one of a beginning and/or an end of the supplemental information within the media signal. The different encoding types used to encode the supplemental information can include intra-versus inter-prediction, prediction direction, sub partitioning, reference indices, motion and illumination change parameters, transforms, and/or quantization parameters.

Any of the methods and techniques described herein can also be implemented in a system, an apparatus or device, a machine, a computer program product, in software, in hardware, or in any combination thereof. For example, the computer program product can be tangibly encoded on a computer-readable medium (e.g., a data storage unit), and can include instructions to cause a data processing apparatus (e.g., a data processor) to perform one or more operations for any of the methods described herein.

Multimedia Coding and Decoding with Additional Information Capability

The inventors recognize that there are times when it may be desirable to transmit secondary information along with transmitted media information, where the media can include video, audio, still images or other multimedia information. The embodiments may refer only to video, however, it should be understood that other forms are also intended to be covered, including audio. This secondary information may be representative of information, and can be used for certain functions as described herein.

A first category of secondary information can include information that is related to the media itself, e.g., the video. Secondary information which is related to the video itself is often called metadata. This kind of secondary information can provide additional information about the transmitted content. For example, different uses for metadata in a video transmission system may include information about a copyright notification, information which can be used to assist or enhance the decoding process, or supplemental information about the video. This information can be used for a variety of applications.

When the secondary information is metadata, it may be important to synchronize that metadata with the media, e.g., with the video feed. It may also be important that the metadata synchronization is retained even when a change in the transport layer is performed. For example, it may be desirable that bits within the metadata signal associate with a block or macroblock of a picture within the video signal.

The secondary information can alternatively be non-metadata information, that is information which is partly or wholly unrelated to the media. It can be a secret communication, or information for support of legacy systems, for example. In an embodiment, the supplemental communication channel is transparent to the decoder, unless the decoder is specially equipped with special decoding parts.

Applications of the secondary information may include 3-D image reconstruction, high dynamic range image generation, denoising, temporal interpolation, super resolution image generation, and error concealment. Techniques may use this to provide secret messages or other information to an end-user. The system can be used for digital signatures, e.g., the information can be used to signal an encrypted or unencrypted message, or hence for a proprietary post-processing system to enhance the quality of the decoded video other applications include steganography, cryptography, signaling of post processing or rate shaping, transcoding hints, error concealment, video content information such as actor or location in the current scene, advertising information, channel guide information, video scrambling of different types, including a first type that completely disallows viewing without descrambling codes, or a second type that allows viewing a lower quality image without scrambling codes, and improves the image when a scrambling code is provided. The secondary information can be bios or other software upgrade information, and the like. Trick mode functionalities can be supported where one can provide hints about the relationship between current and upcoming pictures. This information could then be utilized by the decoder to provide fast forward and rewind functionalities. This system may also be used for bit rate scalability purposes.

Any of the multiple embodiments disclosed herein can be used for any of the above applications in any combination.

An embodiment describes use of a system that operates in conjunction with a coding system such as the MPEG-4 AVC standard, that is used in a first embodiment. These coding systems represent block partitions using a variety of different coding modes. The specific mode is typically selected by the encoder in a way that compresses the information within the blocks as efficiently as possible. Different modes use different prediction techniques for predicting the texture, motion and illumination changes within the video signal. For example, this can include intra-prediction and inter-prediction. A sub partitioning method may also be used. For example, intra-coding of a block may be predicted for 4×4, 8×8, or 16×16 prediction blocks. For inter-prediction, a mode can signal a sub partitioning method within a current portion, e.g., a macroblock or block. Each of the sub partitions can further be associated with a reference picture index for inter-prediction. Other information beyond the motion vectors can also be used, including transform size, motion vectors themselves which can be translational, affine, or other type, and illumination parameters such as weights, offset parameters, different transforms, and quantization parameters.

Each of these different ways of coding the signals, including intra-versus inter-prediction, prediction direction, sub partitioning, reference indices, motion and illumination change parameters, transforms, and/or quantization parameters, are referred to generically as being prediction information.

An embodiment uses the specific kind of prediction information to encode the supplemental information according to information that represents a relationship between the prediction information and certain data bits. The information may be a look up table, or other similar table relating modes to information.

FIGS. 1-5 illustrate how codecs, such as a codec based on the MPEG-4 AVC/H.264 standard, can use a variety of different modes to represent a macroblock. For example, consider the macroblock shown in FIG. 1. If one considers this to be a 16×16 macroblock, then the entire macroblock can be predicted in a number of different ways. 100 shows the macroblock predicted as a single 16×16 partition with a single motion vector. 102 shows a 16×8 partition, while 104 shows an 8×16 partition. 106 shows 4 separate 8×8 partitions being used.

In an analogous way, each partition can have a different motion vector. For the bi-predictive case, one may transmit two sets of motion vectors per block. There may be up to 16 references for motion compensated prediction, that can be assigned down to an 8×8 block size. Motion compensation can also be performed down to quarter pixel accuracy. Weighted prediction methods can be used to improve the performance especially in the presence of illumination changes.

Figure 2:
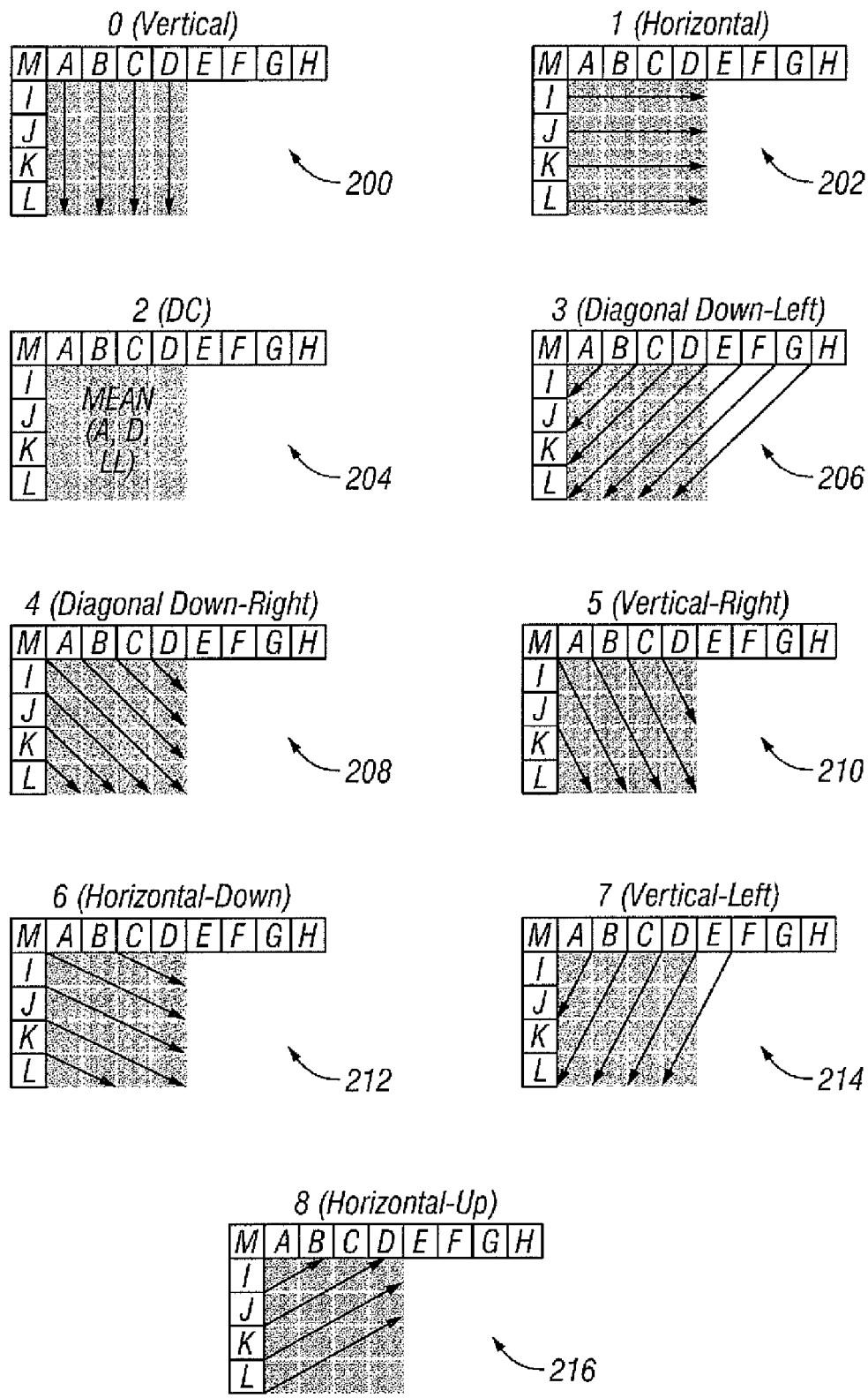
FIG. 2 depicts examples of different intra 4×4 prediction modes in the AVC standard.

For intra-coding, intra-prediction modes can be used which improve the coding performance. For example, FIG. 2 shows multiple different 4×4 block sizes and how intra-coding can be used in these block sizes to produce a mode which is vertical in 200, horizontal in 202, DC in 204, diagonal down left in 206, diagonal down right in 208, vertical right in 210, horizontal down in 212, vertical left in 214 and horizontal up in 216. These prediction modes provide nine prediction modes for each 4×4 block.

Figure 3:
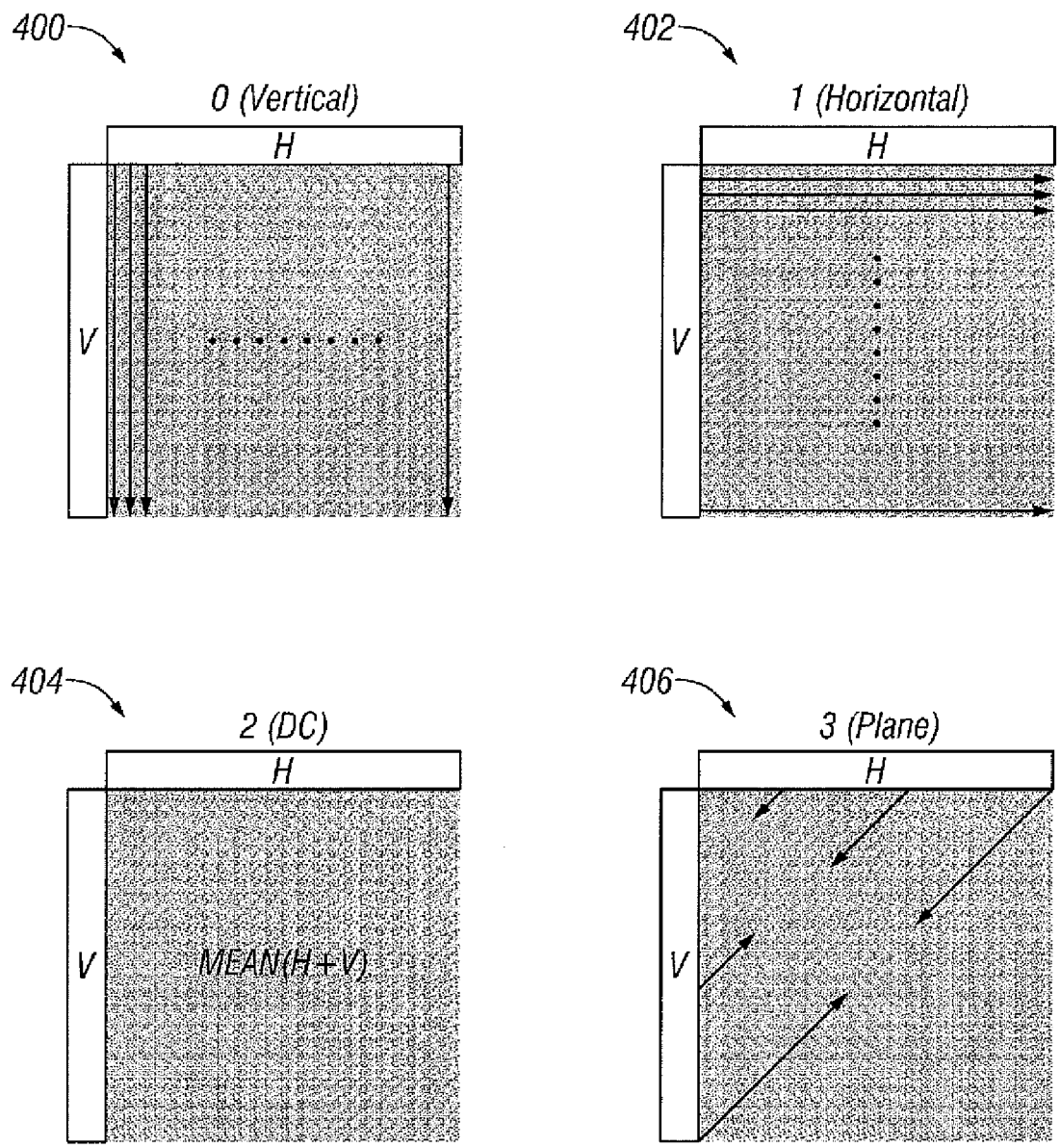
FIG. 3 depicts examples of different intra 16×16 prediction modes in the AVC standard.

Prediction may also be performed with other block sizes. For example, FIG. 3 illustrates how AVC may consider intra 16×16 prediction modes for prediction. 400 illustrates a vertical prediction mode, 402 illustrates a horizontal prediction mode, 404 illustrates a DC prediction mode, and 406 illustrates a planar prediction mode. Prediction can also be performed within AVC using 8×8 modes, while other current or future codecs may consider other prediction block sizes or modes.

Figures 4, 5, 6:
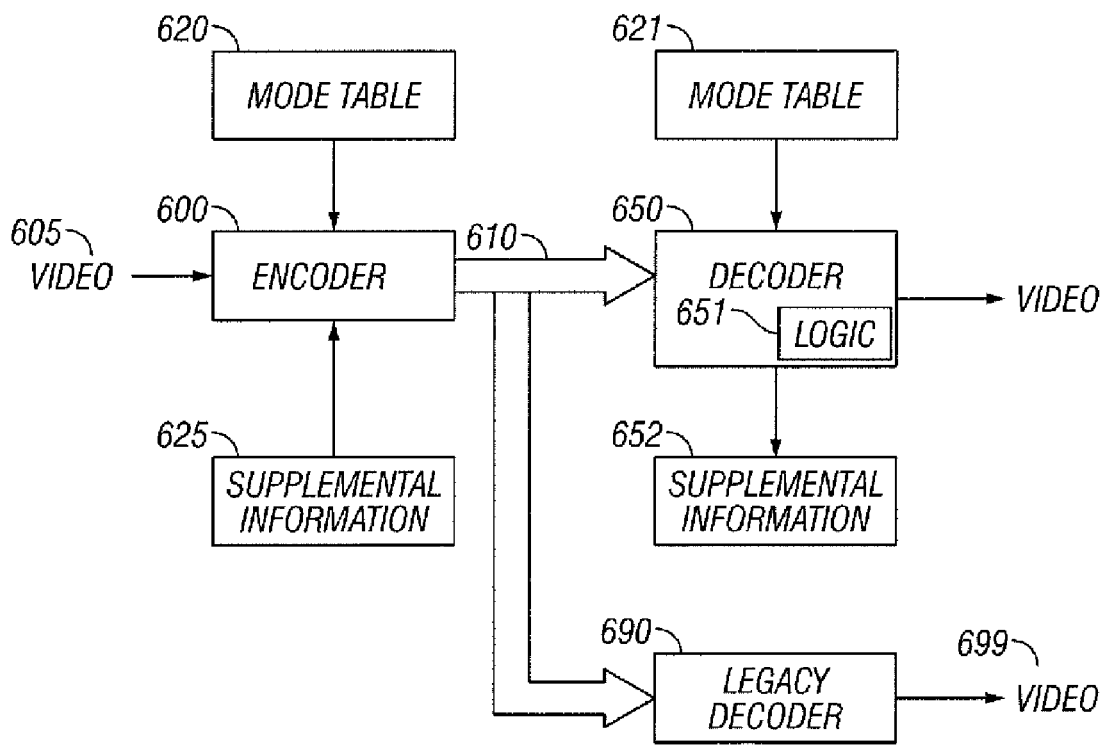
FIGS. 4 and 5 respectively illustrate examples of intra prediction blocks and 4×4 block scanning within AVC.
FIG. 6 depicts a block diagram illustrating an example of the coding and decoding sequence.

FIGS. 4 and 5 illustrate respectively intra prediction blocks of 4×4 block size, and their respective scanning order within AVC.

These figures illustrate some of the different predictions that can be used for coding. An encoder will typically select the coding mode that provides the preferred mode of operation. In most cases, the selection is based on the coding prediction that provides the best quality in terms of a predetermined quality measure, number of bits, and/or complexity. The inventors have recognized that the selection process can be used to itself encode information—so that the specific modes encode information.

According to an embodiment, the specific modes which are used for the encoding are selected in a deterministic manner. The specific selection is done to represent the supplemental information.

FIG. 6 illustrates an embodiment of using this deterministic coder 600 to encode additional information within a video stream. The deterministic coder 600 is shown in FIG. 6, receiving video 605 to be encoded, and producing encoded video 610. As described above, this may use the MPEG-4 AVC standard, or any other coding scheme that allows encoding using one of multiple different encoding techniques. The deterministic coder in FIG. 6, however, uses a mode table 620 to determine which of the predictions or coding schemes is used. The supplemental information 625 is input to the coder. The mode table 620 specifies a relationship between the different prediction/coding schemes, and the digital bits of supplemental information to be represented by that coding scheme. In operation, the coder 600 operates based on the supplemental information to select modes from the mode table 620 to represent that supplemental information.

The encoded video 610 has been encoded according to the supplemental information 625. However, both a special decoder such as 650, as well as a legacy decoder such as 690, can decode this video 610, since the video is encoded according to the standard, and has no special parts added. The legacy decoder 690 decodes the video and produces output video 699. The supplemental information will be lost, but the decoding will not be effected.

The secondary information can be retrieved from the decoder 650 that is specially configured to decode the mode information. The decoder 650 includes a mode table 621 which may be the same mode table used by the encoder 600. The mode table 621 is driven by the decoder's determination of which encoding mode was used, to in effect decode the supplemental information which was encoded into the selections of coding schemes which were used. A logic module 651 within the decoder determines that the video 610 is specially coded with this information, and also retrieves the supplemental information 652 from the video and the mode table, and outputs it. The output supplemental information can be time-synchronized with the area of video, e.g., the frames that contained it.

The mode table can be formed by establishing any relationship between bits or bytes of information, and the specific coding block types. For example, Table 1 illustrates intra-macroblock types and their assignment to supplemental data symbols.

TABLE 1

Intra Macroblock types and their assignment to metadata symbols

| mb_type | Name of mb_type | MbPartPredMode (mb_type, 0) | I16x16PredMode | CBPChroma | CBPLuma | Sec Data Symbol$_A$ | Sec Data Symbol$_B$ |
|---|---|---|---|---|---|---|---|
| 0 | I_4x4 | Intra_4x4 | na | na | na | 0000 | Up to $9^{16}$ possible combinations |
| 1 | I_16x16_0_0_0 | Intra_16x16 | 0 | 0 | 0 | 0001 | Depends on mb_type 0 |
| 2 | I_16x16_1_0_0 | Intra_16x16 | 1 | 0 | 0 | 0010 | " |
| 3 | I_16x16_2_0_0 | Intra_16x16 | 2 | 0 | 0 | 0011 | " |
| 4 | I_16x16_3_0_0 | Intra_16x16 | 3 | 0 | 0 | 0100 | " |
| 5 | I_16x16_0_1_0 | Intra_16x16 | 0 | 1 | 0 | 0101 | " |
| 6 | I_16x16_1_1_0 | Intra_16x16 | 1 | 1 | 0 | 0110 | " |
| 7 | I_16x16_2_1_0 | Intra_16x16 | 2 | 1 | 0 | 0111 | " |
| 8 | I_16x16_3_1_0 | Intra_16x16 | 3 | 1 | 0 | 1000 | " |
| 9 | I_16x16_0_2_0 | Intra_16x16 | 0 | 2 | 0 | 1001 | " |
| 10 | I_16x16_1_2_0 | Intra_16x16 | 1 | 2 | 0 | 1010 | " |
| 11 | I_16x16_2_2_0 | Intra_16x16 | 2 | 2 | 0 | 1011 | " |
| 12 | I_16x16_3_2_0 | Intra_16x16 | 3 | 2 | 0 | 1100 | " |
| 13 | I_16x16_0_0_1 | Intra_16x16 | 0 | 0 | 15 | 1101 | " |
| 14 | I_16x16_1_0_1 | Intra_16x16 | 1 | 0 | 15 | 1110 | " |
| 15 | I_16x16_2_0_1 | Intra_16x16 | 2 | 0 | 15 | 1111 | " |
| 16 | I_16x16_3_0_1 | Intra_16x16 | 3 | 0 | 15 | Ignore | " |
| 17 | I_16x16_0_1_1 | Intra_16x16 | 0 | 1 | 15 | Ignore | " |
| 18 | I_16x16_1_1_1 | Intra_16x16 | 1 | 1 | 15 | Ignore | " |
| 19 | I_16x16_2_1_1 | Intra_16x16 | 2 | 1 | 15 | Ignore | " |
| 20 | I_16x16_3_1_1 | Intra_16x16 | 3 | 1 | 15 | Ignore | " |
| 21 | I_16x16_0_2_1 | Intra_16x16 | 0 | 2 | 15 | Ignore | " |
| 22 | I_16x16_1_2_1 | Intra_16x16 | 1 | 2 | 15 | Ignore | " |
| 23 | I_16x16_2_2_1 | Intra_16x16 | 2 | 2 | 15 | Ignore | " |
| 24 | I_16x16_3_2_1 | Intra_16x16 | 3 | 2 | 15 | Ignore | " |
| 25 | I_PCM | Na | na | na | na | Ignore | " |

Of course, this is just an example, and different bits can be associated with different modes.

Table 1 shows how the intra-coding modes can be used to signal bits from the secondary information data string. Different macroblock types represent a different secondary data signal. For an embodiment using AVC, there are 9 on the power of 16 different possible combinations of different intra 4×4 prediction modes, without even considering chrominance prediction. Additional combinations can be derived using 8×8 or 16×16 intra-prediction, and the modes for chrominance prediction. The prediction in this embodiment is dictated by the supplemental information, rather than by the most efficient coding scheme. Other standards or future standards may use more or fewer modes.

Forcing a specific video prediction however, may produce a sub optimal coding system. In an embodiment, any artifacts due to inappropriate prediction can be compensated by subsequent coding of a residual. This may mitigate the quality effects.

According to some embodiments, the prediction signals are grouped in a way as to attempt to minimize the impairment on performance. For example, an embodiment may separate modes according to their similarity in terms of prediction.

In video compression such as AVC, encoding decisions at one time may affect future decisions and performance. In particular, it is possible that coding an image block with a mode A0 would result in a Rate Distortion cost of value cost0. This first coding decision though may affect also the compression performance of an adjacent block. In particular if an adjacent block is coded with mode B0, it could result in cost1. Therefore, the total cost to these two blocks using modes A0 and B0 is cost0+cost1.

An alternative decision might code these blocks with mode A1 for the first and modes D1 for the second. A1, B1 could then result in cost2 for the first block and cost3 for the second. The total cost is cost2+cost3.

Although it is possible that cost0<cost2, it is also possible that cost2+cost3 could be similar to cost0+cost1 (joint distortion of two blocks). When that happens, then using mode A0 followed by mode B0, is said to be equivalent to using mode A1 followed by mode B1.

The embodiment assigns different binary signatures to each mode, or in this case, mode pair. This allows, for example, assigning a "0" to A0B3, and assigning a "1" to A1B1. Since they have equivalent performance, information can be signaled by the selection without a corresponding cost on encoding.

This separation may ensure that there exists a pair of blocks that are the same performance wise, and that a good mode for compression can also be found.

This technique is generalized for more blocks, modes, and signaled bits. For example, FIG. 4 shows 16 different 4×4 blocks which could result in several combinations of modes. Some of these combinations could result in equivalent performance, which, if measured, could allow determining how to assign metadata binary signatures to mode combinations.

Based on this, Table 1 shows two different secondary information symbols labeled A and B. Table 1 shows how the combination of mode 0 for block a00 and mode 1 for block a01 in FIG. 4 provides on average for similar performance to that of mode 2 and mode 0 for block a00 and a01 respectively. The same deterministic rules are used by the decoder to detect and decode the secondary information without overhead signaling information. In the embodiment, start and end codes can be used to demarcate sections of secondary information. Other overhead signaling information can also be used to assist or provide hints to the decoding process.

An embodiment uses a technique to classify which prediction modes can be grouped together for signaling purposes in a way to minimize the effect on efficiency.

In the embodiment, a set of prediction samples $P_i$ are used to generate all or most prediction blocks using all or some of the available intra-prediction modes.

For each intra-prediction mode j, $P_i$ would result in prediction block $B_{ij}$.

For each $B_{ij}$, an absolute distance versus all other prediction modes is determined as $D_{ijk}$, the distance between modes j and k, as distance $(B_{ij}-B_{ik})$.

The cumulative average distance of mode j versus mode k is computed as $$CD_{jk} = \sum_i \text{distance}(B_{ij} - B_{ik}). \quad (1)$$

This is evaluated using graph theory and by selecting the cumulative distance as the cost between two prediction modes. The prediction modes are then sorted by considering them as a shortest path problem, e.g., a traveling salesman problem. Based on the solution, all or some of the prediction modes can be segmented for the best coding performance.

More specifically, each node in the graph is scanned according to the shortest path solution, and each node is assigned to a different cluster/symbol based on that ordering. If there are N symbols and M sorted nodes with M>N, then node M is assigned to symbol $S_{(M\%N)}$, where % is the modulo operator.

Suboptimal but simpler solutions could also be considered by first splitting the problem into multiple sub-problems, where each sub-problem only considers a subset of the intra-prediction modes for optimization using a similar technique. These subsets could be determined using already predefined rules such as the fact that two modes of opposite prediction direction are already known to be very dissimilar and can be therefore considered together.

Another embodiment signals the transform to encode the current macroblock in other sizes, for example, 4×4, 4×8, 8×4, or any other macroblock size that may be supported by other codecs such as VC-1, AVS, VP-6, or VP-7.

Another embodiment may carry this out for inter-slices such as P and B slices. Even though all possible intra-coding modes can be used for signaling information, they may have a lower coding efficiency as compared to inter/motion compensated coding modes. Accordingly, the use of intra-coding modes may cause coding efficiency to suffer. The inter-modes may be used for signaling within slice types.

FIG. 1 illustrates how the AVC standard supports 4 different partition types to encode a macroblock using inter-prediction shown as 100, 102, 104 and 106, respectively supporting 16×16, 16×8, 8×16, and 8×8 partitions for the motion compensation. Each 8×8 partition can be further partitioned into 4 smaller sub partitions of 8×8 shown as 108 in FIG. 1, 8×4, shown as 110 in FIG. 1, 4×8 shown as 112 in FIG. 1 and 4×4 shown as 114 in FIG. 1. Even ignoring level and profile constraints which detect which macroblocks could be used, this still permits for $4^4$=256 possible combinations (for an 8×8 subpartition), or eight bits per macroblock.

Each 8×8 partition can also consider up to 16 different reference indices. The combinations and therefore the number of signatures represented by the signaling become considerably higher. For example, using 16 references allows up to $4^{12}=16777216$ possible combinations or 24 bits per macroblock.

The modes can also be clustered together, to reduce coding overhead and performance impact. Use of the inter-modes for bit signaling may have less effect on visual quality.

Another embodiment may use only a limited number of modes for signaling purposes to provide a trade-off between capacity and compression efficiency. According to this embodiment, only inter macroblock partitions are used for signaling which ignore reference indices in an 8×8 sub macroblock partition. This still allows signaling of up to two bits per macroblock. An encoder signals a certain bit combination by using the mode associated with the combination and disallowing all other modes. Motion estimation and reference index selection can then be performed in the same manner as with the normal encoder. For a CIF resolution (352×288) that includes 396 macroblocks, this suggests the ability to transmit up to 396×2=792 bits or 99 bytes of information per frame.

Table 2 illustrates the inter-macroblock types for P slices and assignment to symbols.

TABLE 2

Inter MB types for P slices and a possible assignment to supplemental information symbols.

| mb_type | Name of mb_type | NumMbPart (mb_type) | MbPartWidth (mb_type) | MbPartHeight (mb_type) | Metadata Symbol |
|---|---|---|---|---|---|
| 0 | P_L0_16x16 | 1 | 16 | 16 | 00 |
| 1 | P_L0_L0_16x8 | 2 | 16 | 8 | 01 |
| 2 | P_L0_L0_8x16 | 2 | 8 | 16 | 10 |
| 3 | P_8x8 | 4 | 8 | 8 | 11 |
| 4 | P_8x8ref0 | 4 | 8 | 8 | 11 |
| inferred | P_Skip | 1 | 16 | 16 | 00 |

The method can be extended to B slices.

Table 3 illustrates how inter-modes in B slices down to the 8×8 macroblock partition are each assigned to a four bit message. In a similar way to P slices, given a certain four bit message, the encoder selects the appropriate mode to be signaled. The selection encodes the secondary information.

TABLE 3

Inter MB types for B slices and a possible assignment to metadata symbols. Considering the increase in modes, the signalling can be extended to cover more bits.

| mb_type | Name of mb_type | NumMbPart (mb_type) | MbPartWidth (mb_type) | MbPartHeight (mb_type) | Metadata Symbol$_A$ | Metadata Symbol$_B$ |
|---|---|---|---|---|---|---|
| 0 | B_Direct_16x16 | Na | 8 | 8 | 00 | 0000 |
| 1 | B_L0_16x16 | 1 | 16 | 16 | 00 | 0000 |
| 2 | B_L1_16x16 | 1 | 16 | 16 | 00 | 0001 |
| 3 | B_Bi_16x16 | 1 | 16 | 16 | 00 | 0010 |
| 4 | B_L0_L0_16x8 | 2 | 16 | 8 | 01 | 0011 |
| 5 | B_L0_L0_8x16 | 2 | 8 | 16 | 10 | 0100 |
| 6 | B_L1_L1_16x8 | 2 | 16 | 8 | 01 | 0101 |
| 7 | B_L1_L1_8x16 | 2 | 8 | 16 | 10 | 0110 |

Some modes can be excluded from metadata signaling in order to improve performance or reduce quality degradation. For example, take the situation where a macroblock j can be encoded with considerably better quality and performance using one of the excluded modes, as compared with the mode dictated by the current secondary information symbol $SYM_j$, then the excluded mode can be selected for encoding. The symbol $SYM_j$ is instead used to encode macroblock j+1, or the first subsequent macroblock for which the excluded modes do not provide significant improvement in group coding performance compared with the mode dictated by the symbol j.

Taking an example, if the new area is uncovered or a new object appears within a video scene, one could safely use intra-coding without impacting the quality but also without losing any bits for the secondary information signal. The embedding capacity of the single frame may be reduced, but the corresponding impact on compression efficiency and subsequent quality may be lower.

One may also adjust the tolerance in the encoder between selecting an excluded mode for compression efficiency purposes as compared with selecting a mode associated with a secondary information symbol. This may provide a trade-off between embedding capacity and coding performance.

Too much of the secondary information can affect the compression efficiency. Some scenarios may require secondary information to be inserted only in some frames or pictures within a video sequence. The secondary information is added on some pictures (frames), or only in certain pictures within the bitstream. This can be done for example in a periodic or pseudorandom fashion. As examples, this can be used to provide secondary information for enabling video trick modes such as fast-forward and rewind or random access. Although a message could be inserted at known/predefined locations, messages could also be inserted at arbitrary locations for a variety of reasons. It is therefore important in such cases to be able to detect the presence, and therefore also be able to fully decode the message.

According to an embodiment, the decoder 650 should be able to detect the messages, but ensure that it is detecting an intentionally-encoded message—to avoid detecting a message when one is not present. It is analogously important to avoid false negatives such as not detecting a message even though the message is present. In an embodiment, start codes and end codes are embedded within the video stream prior to and after signaling the secondary information. The start codes and end codes may use predefined bit sequences that are embedded within the video stream using the same technique as that used for the actual secondary information. For example, this may be done by mapping the bits of the sequences to macroblocks and/or block coding modes.

These codes are selected as a sequence of encoding decisions that would appear infrequently or never in real video to avoid false positives. For example, it may be relatively unlikely to encounter three adjacent macroblocks that are encoded in first a 16 by 8 partition, then a 8 by 16 partition, then 16 by 8 partition respectively. Since these modes have strong relationships with the edges of objects in a horizontal edge, this combination becomes unlikely. The only time that this could happen is when an object has horizontal edges within the left and right macroblocks in a vertical direction.

Another embodiment may reserve start codes and end codes that can only be used for that purpose, and cannot be used for any other purpose within the bitstream. This embodiment may improve detection.

An alternative start code could be signaled using four macroblocks and the sequence 0110011 which can be represented using, in sequence, modes 16×16, 8×8, 16×16 and 8×8.

Increasing the length of the start code sequence correspondingly reduces the probability of false positives. However, it does so at the cost of reducing the embedding capacity of the video streams. A trade-off between length of start codes and false positives therefore should be examined carefully with the intended application in mind. For example, applications that are intended for lower resolution video may use shorter start codes, higher definition material may require longer start codes to improve robustness.

The start code may be followed immediately by the secondary information. In one embodiment, the size of the message data may be a fixed number M. Dynamic length information can also be signaled in bits or bytes of the secondary information immediately after the start code.

Figure 7:
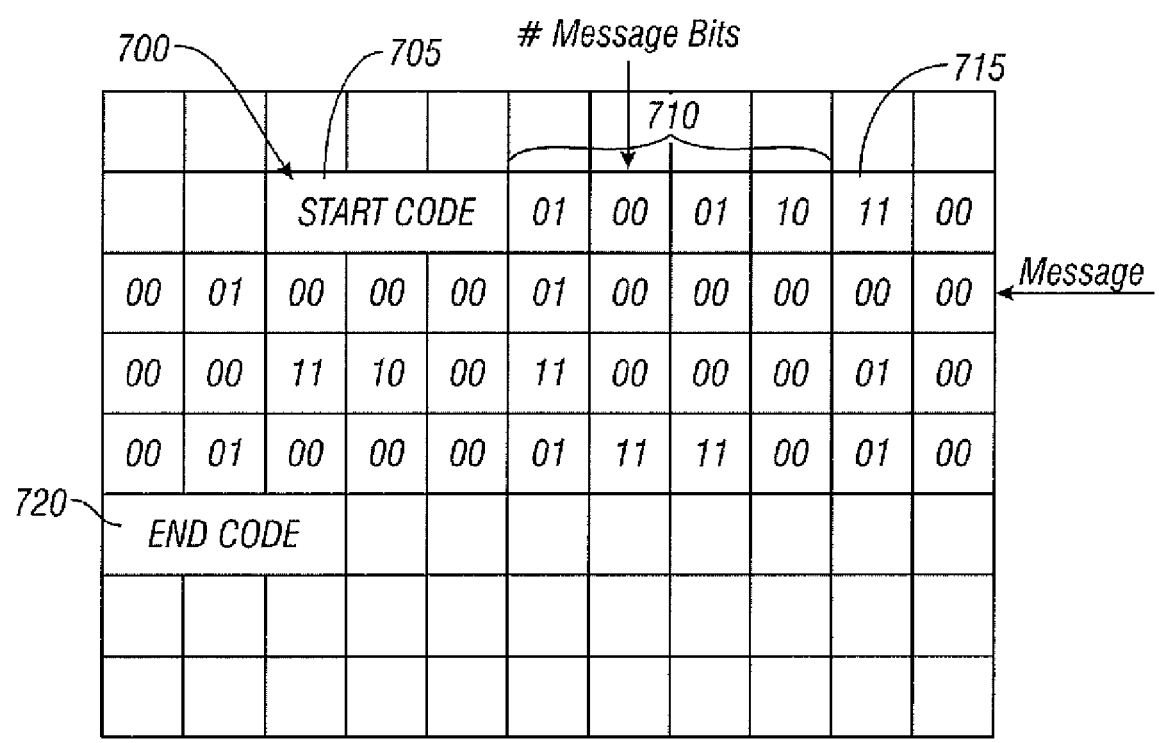
FIG. 7 illustrates examples of start code/end code and signaling.

FIG. 7 shows an embodiment of placing the supplemental information in accordance with the signaling method in Table 2. Each box, such as 700 in FIG. 7, represents a macroblock or frame or picture. The start code 705 is followed by a length code 710, made up of eight bits from four macroblocks to indicate the length of the secondary information. This is followed by the message, beginning with 715. 720 marks the end code that signals the end of the message. If the end code signature is not encountered at the expected location, this suggests that the information does not represent a valid message or that some other errors have occurred. The checking is shown as part of FIG. 11, as explained herein.

In an embodiment, the start code and end code messages can span multiple adjacent pictures within the sequence.

Another embodiment uses external signaling methods to signal the presence and location of the message, in place of the start and stop codes. For example, one embodiment allows this to be performed using the existing supplemental enhancement (SEI) message.

False positives can be reduced by repeating the message within the same picture or in multiple pictures within the sequence. For example, messages that are not repeated, are assumed to be noise or errors. If a possible start code/message/end code, therefore, that does not have the exact same sequence of start code/message/end code in a subsequent picture, it can be discarded.

Start codes and end codes do not need to be constant between pictures.

Data authentication and error correction techniques using parity schemes may also be used for encoding the message to reduce false positives and improve the message's robustness.

In addition, certain macroblocks may not be good candidates for a secondary information signal, and may be preferred to be encoded with an excluded mode. The excluded mode macroblocks do not need to be considered when signaling the number of bits of the actual message.

In one embodiment, it may be preferable to allow errors to be introduced within the message for compression efficiency. As described above, it may be possible that the mode selected for macroblock secondary coding may have a negative impact on coding efficiency. If an error correcting technique is used prior to embedding bits of the message in the bitstream, a message error can be intentionally added without affecting the recoverability of the message.

Figure 8:
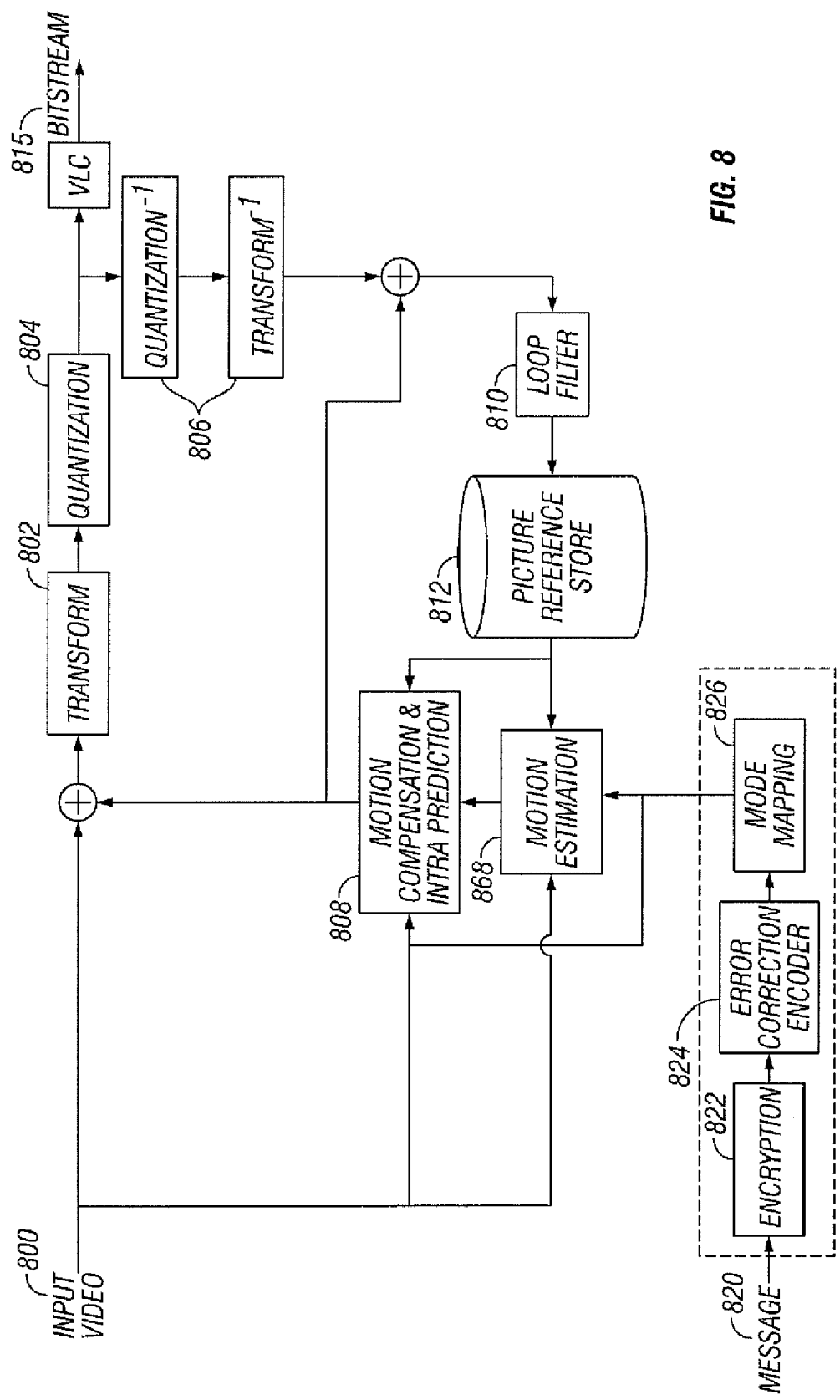
FIG. 8 depicts a block diagram of an example video encoder.

FIG. 8 shows a video encoder using the techniques of the present application. The input video 800 is transformed by a transform device 802 and quantized by a quantization device 804. A feedback structure 806 is used along with a motion compensation and intra-prediction module 808 and a motion estimation module 868 as part of a loop formed by loop filter 810. A picture reference store 812 is also used. Each of these are used together to carry out prediction and compression, and produce a bitstream 815. The message 820 is input to an optional encryption unit 822, and an optional error correction encoder 824. The mode mapping 826 carries out mode mapping between the message 820, and the mode of video encoding, as discussed above.

Figure 9:
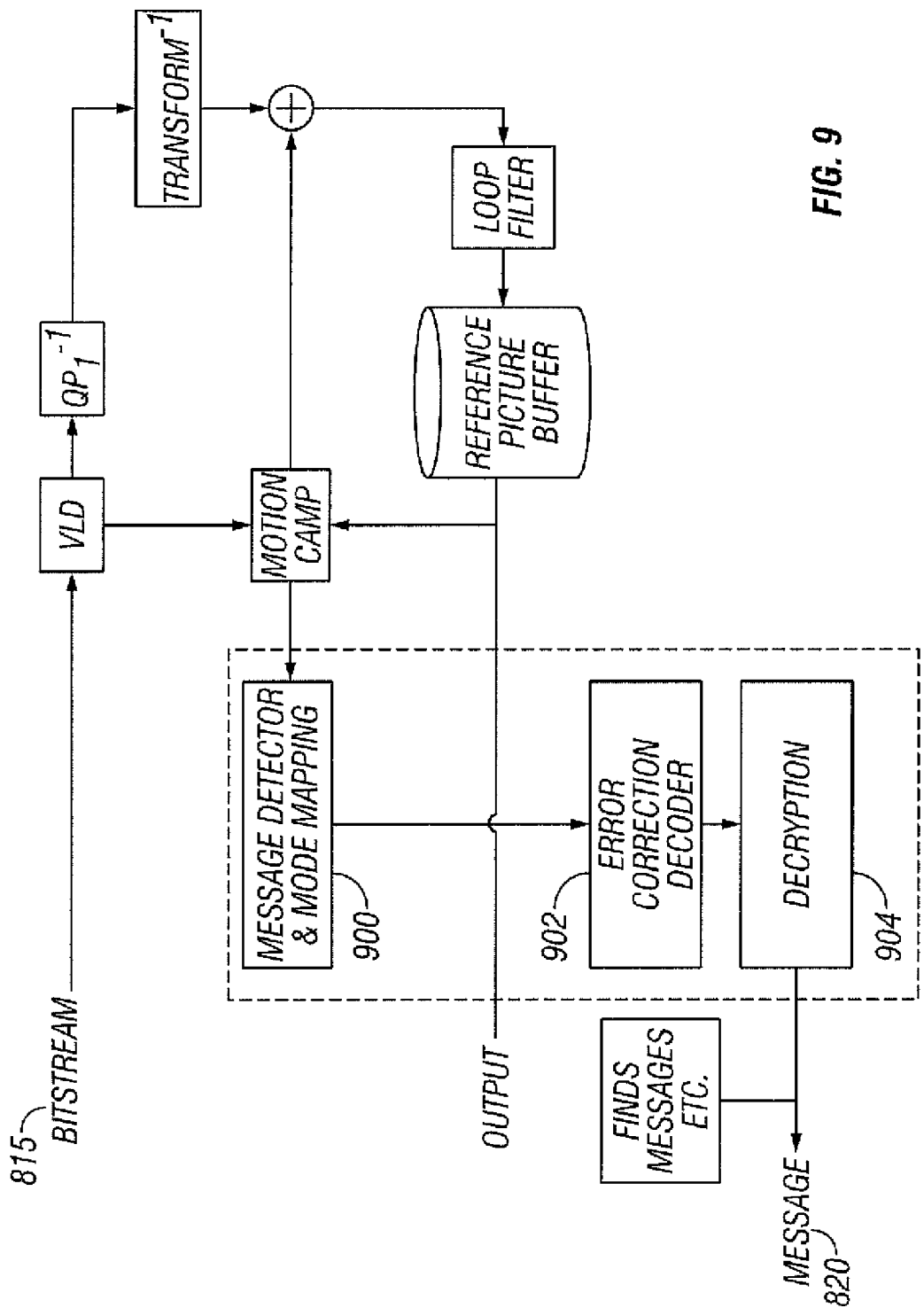
FIG. 9 depicts a block diagram of an example video decoder.

FIG. 9 shows the example decoder, which receives the bitstream 815, and decodes the bitstream, using the inverse quantization, inverse transformation, and motion compensation as well as the reference picture buffer, which is also used for storing pictures for reference. The messaging detector and mode mapping device 900 carries out detecting the message, for example by detecting start and stop bits, decoding the error correction with an error correction decoder 902 and decrypting with a decryption device 904, if necessary to output the message 820.

Another embodiment describes a transcoding unit where a bitstream that already has metadata therein is transcoded, that is encoded at a different bit rate, at a different resolution or using a different codec but retaining the secondary information therein.

Figure 10:
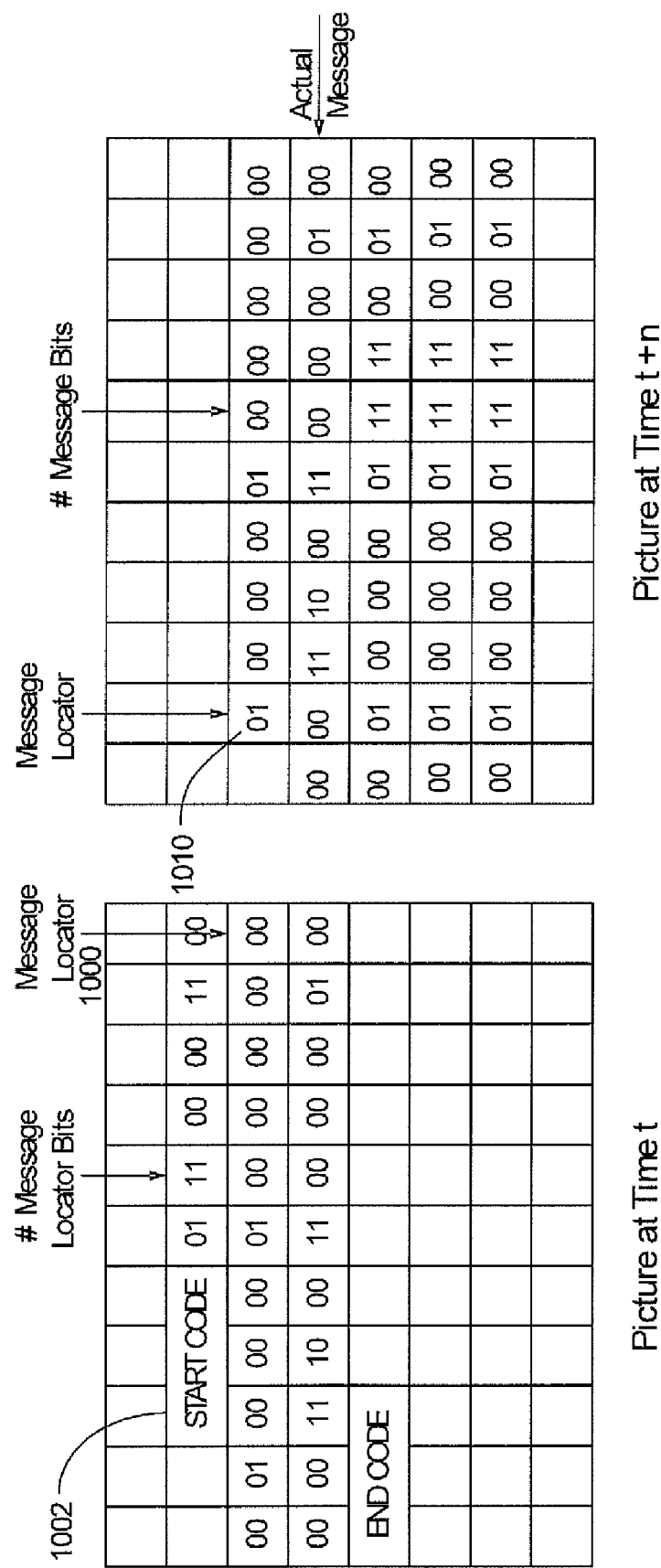
FIG. 10 illustrates an example of a message locator embodiment.

Another embodiment, shown in FIG. 10, involves first encoding a separate message called the message locator. The message locator provides precise information about how and where the actual message can be decoded from within subsequent frames and the video. For example, the message locator may provide a road map about the location or locations which were used to embed the message, the modes to bit mapping, encryption methods, and other information about general reconstruction of the signal.

In FIG. 10, the message locator 1000 comes directly after the start code 1002. This allows the message's real location in both time and space, and the size of the actual message, to be detected. As shown in FIG. 10, the message locator 1000 points to a position 1010 which is in a different macroblock, at a different time. The message locator is in the picture at time t, while the macro blocks referred to by that message locator are in the picture at time t+1.

The time and space of the original message can therefore be encoded in this way. If the message locator is encrypted, it makes it very difficult for an intruder to actually detect the message beginning at 1010.

Figure 11:
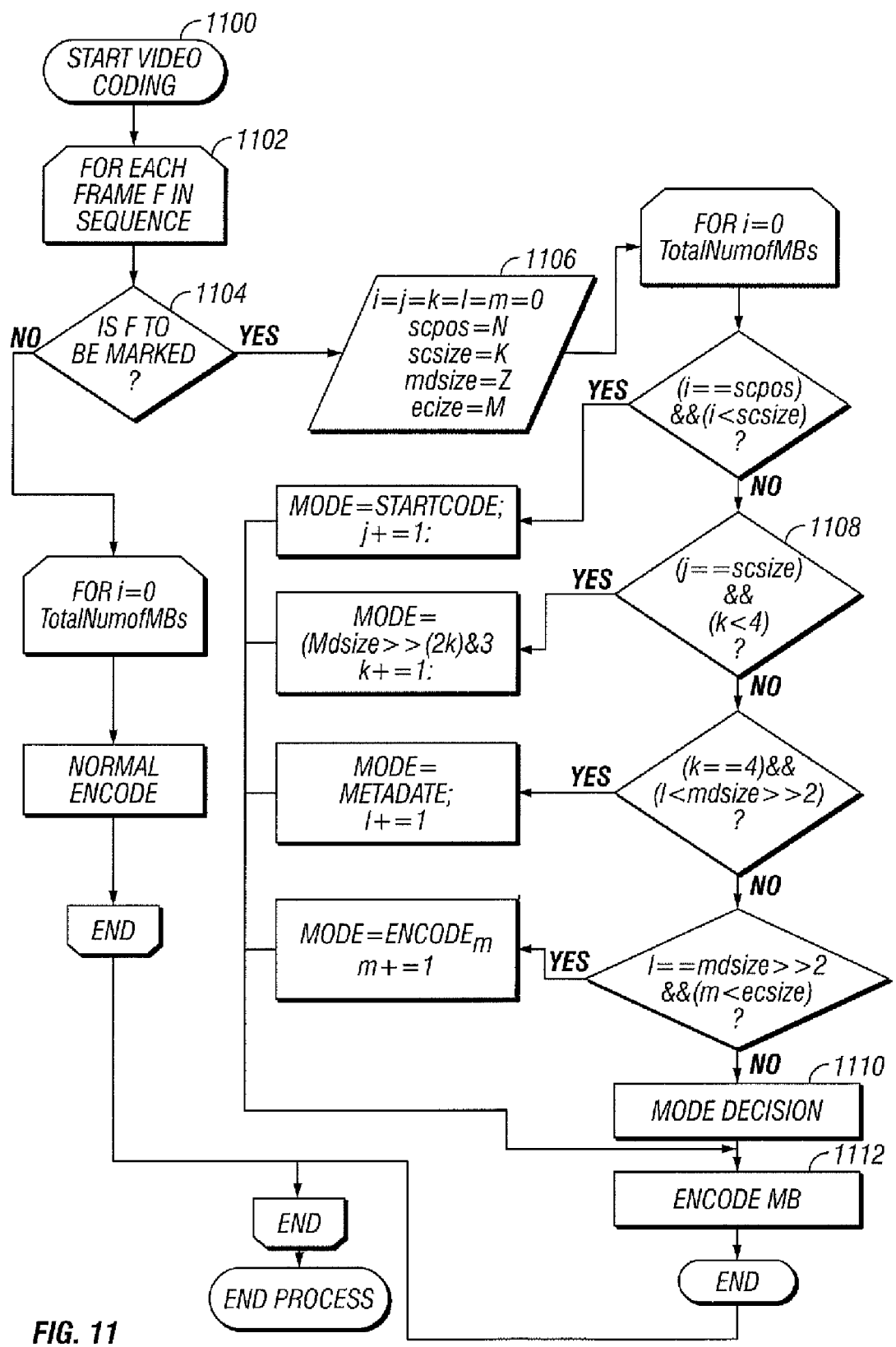
FIG. 11 illustrates an example of marking within the video coding.

FIG. 11 illustrates a flowchart of an example of marking. At 1100, the video coding starts, and for each frame at 1102, 1104 determines if the position is to be marked. If so, the scpos, scsize, mdsize and ecsize which respectively represent the start code start position, size in bits, message size and end code size are set to their initial values at 1106. 1108 illustrates determining values indicative of the size and position of the different values, followed by a mode decision made at 1110.

1112 represents coding the macro block according to this mode decision.

The above has described an embodiment using video compression. However, the techniques disclosed herein could be applied to other media, including audio and speech codecs. The ISO/MPEG-4 AAC compression standard contains numerous audio coding modes that could be used for signaling of supplemental information using the techniques disclosed herein. For example, the codec employs 11 selectable Huffman codebooks for lossless encoding of quantized transform coefficients. Given an input frame of audio samples, an AAC encoder will select a set of Huffman codebooks that minimizes the number of bits required for coding transform coefficients. An AAC encoder of this embodiment could receive the metadata bits to be transmitted and then alter the selection of Huffman codebooks accordingly. Coding modes are also available that, when set to suboptimal states, can be at least partially offset by subsequent encoding decisions. Examples include the transform window type (sine/KBD), joint stereo coding decisions (Mid/Side coding), and TNS filter length, order, resolution, and direction. Within the AMR NB speech codec, the positions and signs of the coded pulses, the LPC model coefficients (vector quantized line spectral pairs), and the pitch lag serve as coding modes that could be utilized by this embodiment.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative that might be predictable to a person having ordinary skill in the art. For example, other encoding processes can be used. This system can be used with other media. Moreover, although features may be described above as acting in certain combinations and even initially claimed as such, one or more features from a claimed combination can in some cases be excised from the combination, and the claimed combination may be directed to a subcombination or variation of a subcombination.

ENUMERATED EXAMPLE EMBODIMENTS

Embodiments may relate to one or more enumerated example embodiments below.

1. A method for encoding a discrete-time media signal, comprising:

receiving a media signal;

obtaining supplemental information to be encoded within said media signal;

using said supplemental information to select one encoding type from a plurality of different encoding types; and encoding said media signal using said one encoding type, where the encoding type represents the supplemental information.

2. A method as in enumerated example embodiment 1, wherein said media signal is a video signal.

3. A method as in enumerated example embodiment 2, wherein said encoding type includes at least one of a plurality of prediction modes for the video signal.

4. A method as in enumerated example embodiment 3, further comprising grouping together prediction modes into signaling groups which are selected to reduce an effect on coding performance.

5. A method as in enumerated example embodiment 2, further comprising defining at least one of a start code, an end code, or a length code, and using said encoding type to represent said at least one of said start code, end code, or length code within the video signal location adjacent the supplemental information.

6. A method as in enumerated example embodiment 5, wherein said start code or end code represent sequences of encoding decisions which are unlikely to occur in real video.

7. A method as in enumerated example embodiment 2, wherein said supplemental information is related to contents of the video signal, and is temporally synchronized with different portions of the video signal.

8. A method as in enumerated example embodiment 2, wherein said supplemental information is unrelated to the video signal.

9. A method as in enumerated example embodiment 3, further comprising determining coding types that have approximately similar performance, and grouping said coding schemes to form groups that reduce the effect that said using will have on coding performance.

10. A method as in enumerated example embodiment 2, further comprising detecting a first encoding type that is selected based on the secondary information, in which the first encoding type causes degradation in the video, and overriding said selecting based on said detecting.

11. A method as in enumerated example embodiment 10, wherein said overriding said encoding type comprises delaying encoding the secondary information until a different area of the video is received.

12. A method as in enumerated example embodiment 10, wherein said detecting includes basing said detecting on a change within the video signal.

13. A method as in enumerated example embodiment 12, wherein said overriding comprises changing between inter-coding and intra-coding being used to represent the supplemental information.

14. A method as in enumerated example embodiment 2, further comprising using external signaling to indicate at least one of a beginning or an end of the supplemental information within the video signal.

15. A method as in enumerated example embodiment 2, wherein said different encoding types used to encode said supplemental information include intra-versus inter-prediction, prediction direction, sub partitioning, reference indices, motion and illumination change parameters, transforms, or quantization parameters.

16. A method, comprising:
decoding an encoded media signal and determining an encoding type that was used for encoding the media signal as one of a plurality of different encoding types;
using said encoding type to access a relationship between media encoding types and bits of information; and
obtaining said bits of information as supplemental information from said decoding.

17. A method as in enumerated example embodiment 16, wherein said media signal is a video signal, and said media encoding types include video encoding modes.

18. A method as in enumerated example embodiment 17, wherein said encoding type includes at least one of a plurality of prediction modes for the video signal.

19. A method as in enumerated example embodiment 18, further comprising determining at least one of a start code or an end code from said bits of information, and detecting the supplemental information adjacent to said start code or said end code.

20. A method as in enumerated example embodiment 17, further comprising detecting said supplemental information as temporally synchronized with different portions of the video signal.

21. A method as in enumerated example embodiment 17, further comprising detecting said supplemental information is unrelated to the video signal.

22. A method as in enumerated example embodiment 17, wherein said encoding types include inter-coding and intra-coding being used to represent the supplemental information.

23. A method as in enumerated example embodiment 17, further comprising detecting external signaling that indicates at least one of a beginning or an end of the supplemental information within the video signal.

24. A method as in enumerated example embodiment 17, wherein said different encoding types used to encode said supplemental information include intra-versus inter-prediction, prediction direction, sub partitioning, reference indices, motion and illumination change parameters, transforms, or quantization parameters.

25. An apparatus, comprising:
a media encoder that operates to encode a media signal in one of plural different prediction modes;
an input for supplemental information to be encoded as part of the media signal; and
a decision part, using said supplemental information to select one of said plural prediction modes based on said supplemental information and to represent said supplemental information.

26. An apparatus as in enumerated example embodiment 25, wherein said media signal is a video signal.

27. An apparatus as in enumerated example embodiment 25, wherein said media signal is an audio signal.

28. An apparatus as in enumerated example embodiment 27, wherein said media encoder is a speech encoder.

29. An apparatus as in enumerated example embodiment 25, wherein said decision part includes a prediction table that relates prediction modes to bits of supplemental information, and said table groups together prediction modes into signaling groups which are selected to reduce an effect on coding performance.

30. An apparatus as in enumerated example embodiment 25, wherein said decision part purposely does not signal the supplemental information due to its impact on coding performance.

31. An apparatus as in enumerated example embodiment 30, wherein the supplemental information was previously encoded using an error correction scheme.

32. An apparatus as in enumerated example embodiment 26, further comprising storing at least one of a start code or an end code, and using said encoder type to represent said at least one of said start code or end code within the video signal location adjacent to the supplemental information.

33. An apparatus as in enumerated example embodiment 32, wherein said start code or end code represent sequences of encoding decisions which are unlikely to occur in real video.

34. An apparatus as in enumerated example embodiment 26, wherein said supplemental information is related to contents of the video signal, and is temporally synchronized with different portions of the video signal.

35. An apparatus as in enumerated example embodiment 26, wherein said supplemental information is unrelated to the video signal.

36. An apparatus as in enumerated example embodiment 26, wherein said decision part includes information indicative of coding schemes which have approximately similar performance, and groups of coding schemes which reduce the effect that said using will have on coding performance.

37. An apparatus as in enumerated example embodiment 26, wherein said video encoder detects a first encoding type that is selected based on the secondary information, and which first encoding type will cause degradation in the video, and overrides said using said first encoding type based on said detecting.

38. An apparatus as in enumerated example embodiment 37, wherein said overrides operation of said video encoder comprises delaying encoding the secondary information until a different area of the video.

39. An apparatus as in enumerated example embodiment 37, wherein said overrides operation of said video encoder comprises changing between inter-coding and intra-coding being used to represent the supplemental information.

40. An apparatus as in enumerated example embodiment 26, further comprising a connection to an external signaling to indicate at least one of a beginning or an end of the supplemental information within the video signal.

41. An apparatus as in enumerated example embodiment 26, wherein said different encoding types used to encode said supplemental information include intra-versus inter-prediction, prediction direction, sub partitioning, reference indices, motion and illumination change parameters, transforms, or quantization parameters.

42. An apparatus, comprising:
a decoder, decoding an encoded media signal and determining an encoding type that was used for decoding, said decoder determining one of a plurality of different encoding types that decoded the media signal;
a logic part, receiving said encoding type, and using said encoding type to access a relationship between video encoding types and bits of information and to output bits of information as supplemental information from said decoding.

43. An apparatus as in enumerated example embodiment 42, wherein said media signal is a video signal.

44. An apparatus as in enumerated example embodiment 42, wherein said media signal is an audio signal.

45. An apparatus as in enumerated example embodiment 44, wherein said media decoder is a speech decoder.

46. An apparatus as in enumerated example embodiment 41, wherein said logic part stores a plurality of prediction modes for the media signal and bits relating to said prediction modes.

47. An apparatus as in enumerated example embodiment 41, wherein said logic part also detects at least one of a start code or an end code from said bits of information, and detects the supplemental information adjacent said start code or said end code.

48. An apparatus as in enumerated example embodiment 46, wherein said logic part detects and corrects errors in the bit information embedded in the media signal.

49. An apparatus as in enumerated example embodiment 41, wherein said logic part detects said supplemental information as temporally synchronized with different portions of the media signal.

50. An apparatus as in enumerated example embodiment 41, wherein said logic part detects said supplemental information is unrelated to the media signal.

51. An apparatus as in enumerated example embodiment 41, wherein said logic part detects external signaling that indicates at least one of a beginning or an end of the supplemental information within the media signal.

52. An apparatus as in enumerated example embodiment 43, wherein said different encoding types used to encode said supplemental information include intra-versus inter-prediction, prediction direction, sub partitioning, reference indices, motion and illumination change parameters, transforms, or quantization parameters.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation or set-top box. The computer may be a Pentium class computer, running Windows XP or Linux, or may be a Macintosh computer. The encoding and/or decoding can also be implemented in hardware, such as an FPGA or chip. The programs may be written in C, or Java, or any other programming language. The programs may be resident on a storage medium, e.g., magnetic or optical, e.g., the computer hard drive, a removable disk or other removable medium. The programs may also be run over a network, for example, with a server or other machine sending signals to the local machine, which allows the local machine to carry out the operations described herein. Particular embodiments of the disclosure have been described, other embodiments are within the scope of the following claims.

What is claimed is
1. A method for coding comprising:
accessing supplemental information for a video signal, wherein the supplemental information includes a plurality of data symbols;
accessing a mapping between data symbols and inter-motion compensated coding modes;

selecting a plurality of inter-motion compensated coding modes based on the accessed mapping and the plurality of data symbols included in the supplemental information; and encoding the video signal into a bitstream with an encoder according to the selected plurality of inter-motion compensated coding modes and one or more characteristics of the video signal.

2. The method of claim 1, wherein the bitstream comprises partitions corresponding to the inter-motion compensated coding modes, and wherein the supplemental information comprises a message hidden within the bitstream, and the one or more characteristics of the video signal comprises a measure of a quality of the media signal, a number of bits required to encode the video signal, or a complexity of decoding or processing the video signal.

3. The method of claim 1, further comprising:
receiving the bitstream at a decoder for decoding;
decoding the bitstream with the decoder;
accessing the mapping between the data symbols and the inter-motion compensated coding modes;
detecting the supplemental information with a message detector within the decoder;
extracting the supplemental information from the bitstream based on the mapping;
outputting the decoded video signal; and
outputting the supplemental information.

4. The method of claim 3, wherein the supplemental information comprises a start code, an end code, and a message, wherein the start and end codes demarcate the message in the bitstream, wherein the outputting of the supplemental information comprises outputting the message.

5. An encoder comprising:
a plurality of processing units configured to encode a video signal with prediction and compression to produce an encoded bitstream;
a mode mapping unit configured to:
access supplemental information, wherein the supplemental information includes a plurality of data symbols;
access a mapping between data symbols and inter-motion compensated coding modes;
select a plurality of inter-motion compensated coding modes based on the accessed mapping and the plurality of data symbols; and
instruct the plurality of processing units to encode the video signal into the bitstream according to the selected plurality of inter-motion compensated coding modes.

6. The encoder of claim 5, further comprising:
an encryption unit to encrypt the supplemental information; and
an error correction coding unit to encode the supplemental information.

7. The encoder of claim 5, wherein the supplemental information is associated with a start code and an end code, or the supplemental information is associated with the start code and a length code, or the supplemental information is associated with the start code, the end code, and a length code, wherein the start code, end code, and length codes represent signaling information for the supplemental information.

8. A decoder comprising:
processing units configured to decode an encoded bitstream for a video signal, wherein the encoded bitstream comprises supplemental information, the supplemental information comprising a plurality of data symbols corresponding to a plurality of inter-motion compensated coding modes used to encode the bitstream;
a messaging detector to detect the supplemental information in the bitstream; and
a mode mapping device that accesses a mapping between data symbols and inter-motion compensated coding modes and extracts the supplemental information from the bitstream based on the accessed mapping.

9. The decoder of claim 8, wherein the supplemental information comprises a start code, an end code, and a message, wherein the start and end codes demarcate the message in the bitstream.

10. The decoder of claim 8, further comprising:
an error correction decoding unit to decode, detect, and correct at least one error in the supplemental information; and
a decryption unit to decrypt the supplemental information.

11. A coder comprising:
an encoder to encode a video signal with supplemental information in a bitstream, wherein the supplemental information includes a plurality of data symbols, and wherein the encoder is configured to access a mapping between data symbols and inter-motion compensated coding modes, and encode the video signal based on the mapping and a characteristic of the video signal or the supplemental information; and
a decoder to decode the bitstream, wherein the decoder comprises a logic module to detect and retrieve the supplemental information in the bitstream, wherein the decoder is configured to decode the supplemental information by referencing the mapping.

12. The coder of claim 11, wherein the encoder is configured to utilize the mapping and to select from a plurality of inter-motion compensated coding modes based on the characteristic, wherein the characteristic comprises a measure of a quality of the video signal, a number of bits required to encode the video signal, or a complexity of decoding or processing the video signal, and wherein the encoder is configured to encode the video signal according to the selected plurality of inter-motion compensated coding modes.

13. The coder of claim 11, wherein the encoder is configured to encode the video signal such that the encoded video signal is decodable by a second decoder that does not include the logic module, wherein the supplemental information is undetectable to the second decoder.

14. The coder of claim 11, wherein the encoder is configured to omit encoding the supplemental information in the bitstream if a quality of the video signal or the bitstream is affected when the supplemental information is encoded.

15. A method for encoding supplemental information into a video signal comprising:
receiving a video signal;
receiving supplemental information comprising a plurality of data symbols;

mapping each of the data symbols to an inter-motion compensated coding mode to obtain a set of inter-motion compensated coding modes representing the plurality of data symbols;

encoding the video signal into a bitstream using the set of inter-motion compensated coding modes.

16. The method of claim 15, wherein the supplemental information is unrelated to the video signal.

17. The method of claim 15, wherein the bitstream comprises partitions corresponding to the mode information and metadata for a message hidden within the bitstream, and wherein the video signal comprises one or more characteristics related to the metadata or the supplemental information, wherein the one or more characteristics comprises a measure of a quality of the video signal, a number of bits required to encode the video signal, or a complexity of decoding or processing the video signal.

18. The method of claim 15, the method further comprising utilizing the supplemental information to enhance a quality of the video signal, transcode the video signal, correct the video signal, or adjust a level of complexity for decoding or processing the video signal.

19. The method of claim 15 further comprising embedding a plurality of coding modes within the bitstream, wherein the coding modes represent a start code, an end code, a length code, or message data within the bitstream.

20. The method of claim 15, further comprising:
receiving the bitstream at a decoder for decoding;
decoding the bitstream with the decoder;
detecting the supplemental information with a message detector within the decoder; and
extracting the supplemental information by mapping the set of inter-motion compensated coding modes used to encode the bitstream to the plurality of data symbols.

21. The method of claim 20, further comprising encrypting the supplemental information, wherein the supplemental information comprises data for a digital signature, a message, or for cryptography.

22. The method of claim 20, further comprising introducing errors in the supplemental information by adding a message error to the supplemental information prior to encoding the bitstream, and further comprising correcting the message error when extracting the supplemental information, wherein the message error is detectable by the message detector.

23. The method of claim 22, wherein the message error is introduced for a level of a compression efficiency.

24. The method of claim 20, further comprising coding a message locator along with the supplemental information in the video signal; and utilizing the message locator to locate the supplemental information, information for the mapping, information associated with an encryption of the video signal, or information for decoding the bitstream.

* * * * *